United States Patent
Bhat et al.

(10) Patent No.: US 8,894,070 B2
(45) Date of Patent: Nov. 25, 2014

(54) ENERGIZED COMPOSITE METAL TO METAL SEAL

(75) Inventors: Gireesh K. Bhat, Spring, TX (US); David W. Teale, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 728 days.

(21) Appl. No.: 12/363,034

(22) Filed: Jan. 30, 2009

(65) Prior Publication Data

US 2009/0194945 A1     Aug. 6, 2009

(30) Foreign Application Priority Data

Feb. 4, 2008   (WO) ................ PCT/US2008/052936

(51) Int. Cl.
| | |
|---|---|
| *E21B 33/126* | (2006.01) |
| *F16J 15/02* | (2006.01) |
| *F16J 15/18* | (2006.01) |
| *F16J 15/26* | (2006.01) |
| *F16J 15/32* | (2006.01) |
| *F16J 15/08* | (2006.01) |
| *E21B 33/12* | (2006.01) |

(52) U.S. Cl.
CPC ......... *F16J 15/0887* (2013.01); *E21B 33/1212* (2013.01); *F16J 15/3208* (2013.01); *F16J 15/3236* (2013.01)
USPC ........... 277/335; 277/312; 277/530; 277/553; 277/558; 277/647

(58) Field of Classification Search
USPC ......... 277/342, 530, 567, 553, 647, 618, 905, 277/547, 312, 335, 558, 566, 649
See application file for complete search history.

(56) References Cited

U.S. PATENT DOCUMENTS

| | | | |
|---|---|---|---|
| 2,075,947 A | 4/1937 | Kennedy | |
| 2,284,340 A | 5/1942 | Nuckles | |
| 2,733,969 A * | 2/1956 | Polk | ............................... 277/558 |
| 2,841,429 A * | 7/1958 | McCuistion | .................. 277/402 |

(Continued)

FOREIGN PATENT DOCUMENTS

EP     1067320 A2 *   1/2001

OTHER PUBLICATIONS

Office Action issued Aug. 6, 2010, for U.S. Appl. No. 12/374,499, 16 pages.

(Continued)

*Primary Examiner* — Vishal Patel
*Assistant Examiner* — Nicholas L Foster
(74) *Attorney, Agent, or Firm* — Smith IP Services, P.C.

(57) ABSTRACT

An energized composite metal to metal seal. A sealing device includes a metal seal with a metal sealing surface facing radially outward, and another metal sealing surface facing radially inward; and a nonmetal seal including a nonmetal sealing surface positioned proximate one metal sealing surface and facing radially outward, and another nonmetal sealing surface positioned proximate the other metal sealing surface and facing radially inward. A method of sealing between a housing assembly and a closure member includes applying a pressure differential across the sealing device while the sealing device seals between the housing assembly and the closure member, and the pressure differential increasing contact pressure in a metal to metal seal between the housing assembly and a metal sealing surface on the metal seal, and increasing contact pressure in a metal to metal seal between the closure member and another metal sealing surface on the metal seal.

18 Claims, 3 Drawing Sheets

(56) References Cited

U.S. PATENT DOCUMENTS

| | | | | |
|---|---|---|---|---|
| 2,927,830 A * | 3/1960 | Workman | ................ | 92/194 |
| 3,047,300 A | 7/1962 | Taylor et al. | | |
| 3,284,089 A * | 11/1966 | Wrenshall | ................ | 277/530 |
| 3,297,344 A | 1/1967 | Hanes | | |
| 3,572,735 A * | 3/1971 | Dryer | ................ | 277/637 |
| 3,797,864 A | 3/1974 | Hynes et al. | | |
| 3,820,830 A * | 6/1974 | Dryer | ................ | 285/336 |
| 3,907,307 A | 9/1975 | Maurer et al. | | |
| 4,113,268 A | 9/1978 | Simmons et al. | | |
| 4,131,287 A * | 12/1978 | Gunderson et al. | ................ | 277/328 |
| 4,133,542 A * | 1/1979 | Janian et al. | ................ | 277/555 |
| 4,162,782 A * | 7/1979 | Wilkins | ................ | 251/173 |
| 4,178,020 A * | 12/1979 | Dopyera | ................ | 285/18 |
| 4,293,116 A | 10/1981 | Hinrichs | | |
| 4,478,423 A * | 10/1984 | Hjelsand et al. | ................ | 277/516 |
| 4,540,053 A | 9/1985 | Baugh et al. | | |
| 4,585,238 A * | 4/1986 | Nicholson | ................ | 277/555 |
| 4,588,030 A * | 5/1986 | Blizzard | ................ | 166/120 |
| 4,592,558 A * | 6/1986 | Hopkins | ................ | 277/572 |
| 4,719,971 A | 1/1988 | Owens | | |
| 4,747,606 A | 5/1988 | Jennings | | |
| 4,749,043 A | 6/1988 | Rodenberger | | |
| 4,787,642 A * | 11/1988 | Etheridge | ................ | 277/550 |
| 5,095,994 A | 3/1992 | Dollison | | |
| 5,199,718 A * | 4/1993 | Niemiec | ................ | 277/552 |
| 5,205,594 A | 4/1993 | Stoll et al. | | |
| 5,246,236 A * | 9/1993 | Szarka et al. | ................ | 277/337 |
| 5,306,021 A * | 4/1994 | Morvant | ................ | 277/584 |
| 5,316,084 A | 5/1994 | Murray et al. | | |
| 5,433,456 A | 7/1995 | Nicholson | | |
| 5,464,042 A | 11/1995 | Haunhorst | | |
| 5,529,284 A * | 6/1996 | Berger et al. | ................ | 251/149 |
| 5,551,703 A * | 9/1996 | Morvant | ................ | 277/584 |
| 5,755,428 A | 5/1998 | Ollivier | | |
| 5,799,953 A * | 9/1998 | Henderson | ................ | 277/554 |
| 5,887,876 A | 3/1999 | Aldridge et al. | | |
| 5,979,904 A * | 11/1999 | Balsells | ................ | 277/554 |
| 5,997,003 A * | 12/1999 | Turner | ................ | 277/339 |
| 6,086,069 A * | 7/2000 | Bedford | ................ | 277/380 |
| 6,161,838 A * | 12/2000 | Balsells | ................ | 277/511 |
| 6,264,205 B1 * | 7/2001 | Balsells | ................ | 277/551 |
| 6,267,383 B1 * | 7/2001 | Morvant | ................ | 277/439 |
| 6,302,402 B1 | 10/2001 | Rynders et al. | | |
| 6,485,002 B1 | 11/2002 | Goss | | |
| 6,494,465 B1 * | 12/2002 | Bucknell | ................ | 277/641 |
| 6,598,883 B1 | 7/2003 | Hammi et al. | | |
| 6,705,615 B2 | 3/2004 | Milberger et al. | | |
| 6,869,079 B2 * | 3/2005 | Zheng | ................ | 277/511 |
| 6,908,114 B2 | 6/2005 | Moner | | |
| 7,559,366 B2 * | 7/2009 | Hunter et al. | ................ | 166/217 |
| 2002/0140184 A1 * | 10/2002 | Janoff et al. | ................ | 277/644 |
| 2002/0153664 A1 * | 10/2002 | Schroeder | ................ | 277/551 |
| 2003/0000693 A1 | 1/2003 | Couren et al. | | |
| 2008/0169610 A1 * | 7/2008 | Curington | ................ | 277/312 |
| 2010/0052267 A1 * | 3/2010 | Castleman et al. | ................ | 277/551 |

OTHER PUBLICATIONS

International Search Report and Written Opinion issued Sep. 9, 2008, for International Patent Application No. PCT/US07/60648, 6 pages.
International Search Report issued Dec. 11, 2006, for International Patent Application No. PCT/US06/30373, 2 pages.
International Preliminary Report on Patentability and Written Opinion issued Feb. 12, 2009, for International Patent Application No. PCT/US06/30373, 5 pages.
International Search Report and Written Opinion issued Jul. 11, 2008, for International Patent Application Serial No. PCT/US08/52936, 8 pages.
U.S. Appl. No. 12/374,499, filed Jan. 21, 2009, 30 pages.
PerkinElmer Energy Technologies Product Brochure, undated, 2 pages.
PerkinElmer Resilient Metal Seals Product Brochure, 2008, 2 pages.
PerkinElmer PressureScience Seals Product Brochure, undated, 6 pages.
PerkinsElmer Centurion Mechanical Seals Product Brochure, undated, 16 pages.
International Preliminary Report on Patentability issued Aug. 19, 2010, for International Patent Application No. PCT/US08/052936, 6 pages.
Office Action issued Mar. 21, 2011 for U.S. Appl. No. 12/374,499, 11 pages.
Office Action issued Aug. 31, 2011 for U.S. Appl. No. 12/374,499, 17 pages.
Canadian Office Action issued Apr. 10, 2012 for CA Patent Application No. 2,713,648, 2 pages.
Australian Office Action issued Aug. 8, 2012 for AU Patent Application No. 2008349827, 4 pages.
Australian Examination Report issued Sep. 4, 2013 for Australian Patent Application No. 2013200901, 3 pages.
Examination Report issued Jan. 21, 2014 for Australian Patent Application No. 2013200901, 4 pages.
Office Action issued Jul. 10, 2014 for U.S. Appl. No. 12/374,499, 37 pages.

* cited by examiner

US 8,894,070 B2

ENERGIZED COMPOSITE METAL TO METAL SEAL

CROSS-REFERENCE TO RELATED APPLICATION

This application claims priority under 35 USC §119 to International Application No. PCT/US08/52936 filed on Feb. 4, 2008. The entire disclosure of the prior international application is incorporated herein by this reference.

BACKGROUND

The present disclosure relates generally to equipment utilized and operations performed in which reliable low and high pressure sealing is desired and, in an example described herein, more particularly provides an energized composite metal to metal seal for use in downhole tools.

Metal seals are sometimes used to seal between structures in well tools, and in equipment used in other environments. However, several problems are frequently encountered when metal seals are used. For example, metal seals require very smooth and clean surfaces to seal against, and most metals can only be elastically deformed to a limited extent (which thereby limits the biasing force available from elastically deforming a metal seal), etc.

Elastomeric and other types of nonmetal seals may provide the ability to seal against irregular and unclean surfaces, and may provide sufficient resilient biasing force for urging the seals against the surfaces. However, nonmetal seals tend to degrade rapidly when used in dynamic configurations, i.e., where the seal must contact a moving surface while sealing against a pressure differential, or where the seal loses contact with the surface while the pressure differential still exists across the seal.

Therefore, it may be seen that improvements are needed in the art of sealing devices.

SUMMARY

In carrying out the principles of the present disclosure, a sealing device is provided which solves at least one problem in the art. One example is described below in which the sealing device includes both a metal seal and a nonmetal seal. Another example is described below in which the sealing device includes a nonmetal seal which is spring-energized and a metal seal which is energized in response to a pressure differential across the seal.

In embodiments described below, a sealing device is provided that will give an ultra high pressure gas/fluid tight seal between concentric cylindrical members. The device can be mounted either on the inner or on the outer cylindrical member and will provide an annular seal barrier. In addition, the sealing device will be capable of providing a barrier even when one of the members is disengaged completely and then engaged again multiple times, i.e., the sealing device is not limited to static applications.

The sealing device can utilize at least two unique concepts:
1. A composite structure that combines a primary metallic load bearing seal and a secondary "mechanically energized" non-metallic seal. This dual combination provides ideal performance by way of sharing sealing and wiping requirements in dynamic applications and also enabling sealing across high and low pressure differentials.
2. The sealing occurs due to a combination of material geometry/fits and energizing due to the pressure differential. The metal seal is designed such that it is reinforced at higher pressure differentials leading to better sealing. The non-metallic seal is mechanically energized to provide better sealing at lower pressure differentials, and to provide a wiping action in dynamic scenarios.

The metallic seal may be designed such that it is in a state of stress that enables it to exert reaction forces large enough for localized yielding. This may be achieved by using a symmetric construction consisting of an "I" shape as described below.

The "I" shape of the seal can provide a stable, symmetric geometry and may incorporate at least the following unique features:
1. A central rigid section that provides radial stiffness and behaves like a rigid spring.
2. Axially extending arms on either side of the central section. The arms help spread out the load and also provide flexure during dynamic engagement/disengagement by conforming to the surfaces that are to be sealed against. In addition, the arms enable the metal seal to be self-energizing particularly under higher pressure differentials.
3. Ridges on the sealing surfaces of the metal seal to create localized high contact stresses (preferably beyond yield point) and provide a high pressure metal-to-metal seal.

In addition, the geometry of the metallic seal may be biased such that it distributes the loading consistent with the cross-sectional geometry resulting in a graded stress state across the entire cross section, e.g., the outer arms may have a slightly larger thickness than the inner arms. This bias is preferably pronounced closest to the dynamic one of the two cylindrical members.

The design is compact and contains both metal and non-metal seals interlocked in a small package made possible by the "I" shape of the metal seal. In operation, the composite sealing device may be used to isolate two sections of an annular area.

When the sealing device is exposed to relatively low pressure differential, the energized non-metallic seal provides both sealing and wiping functions. As the pressure differential increases, the metallic seal takes over. At significantly higher pressure differentials, the extended arms of the metallic member are self reinforcing and a very high pressure differential seal can be obtained. The extended arms are particularly useful in dynamic applications in that they flex enough to conform to a sealed against dynamic member, thereby helping to maintain a seal even when there is relative movement.

In one aspect, a well tool is provided which includes an internal cylindrical sealing surface, an external cylindrical surface and a sealing device for sealing between the internal and external cylindrical sealing surfaces. The sealing device includes a metal seal with at least first and second metal sealing surfaces. The first metal sealing surface forms a metal to metal seal with the internal cylindrical sealing surface, and the second metal sealing surface forms a metal to metal seal with the external cylindrical sealing surface.

In another aspect, a sealing device is provided which includes at least one metal seal with at least first and second metal sealing surfaces, the first metal sealing surface facing radially outward, and the second metal sealing surface facing radially inward. The sealing device also includes at least one nonmetal seal with at least first and second nonmetal sealing surfaces, the first nonmetal sealing surface being positioned proximate the first metal sealing surface and facing radially outward, and the second nonmetal sealing surface being positioned proximate the second metal sealing surface and facing radially inward.

In yet another aspect, a method of sealing between a housing assembly and a closure member is provided. The method includes the steps of: providing a sealing device including at least one metal seal and at least one nonmetal seal; applying a pressure differential across the sealing device while the sealing device seals between the housing assembly and the closure member; and whereby the pressure differential increases contact pressure in a metal to metal seal between the housing assembly and a first metal sealing surface on the metal seal, and increases contact pressure in a metal to metal seal between the closure member and a second metal sealing surface on the metal seal.

These and other features, advantages, benefits and objects of the present disclosure will become apparent to one of ordinary skill in the art upon careful consideration of the detailed description of representative embodiments of the disclosure hereinbelow and the accompanying drawings, in which similar elements are indicated in the various figures using the same reference numbers.

DETAILED DESCRIPTION

It is to be understood that the various embodiments of the present disclosure described herein may be utilized in various orientations, such as inclined, inverted, horizontal, vertical, etc., and in various configurations, without departing from the principles of the present disclosure. The embodiments are described merely as examples of useful applications of the principles of the disclosure, which is not limited to any specific details of these embodiments.

In the following description of the representative embodiments of the disclosure, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
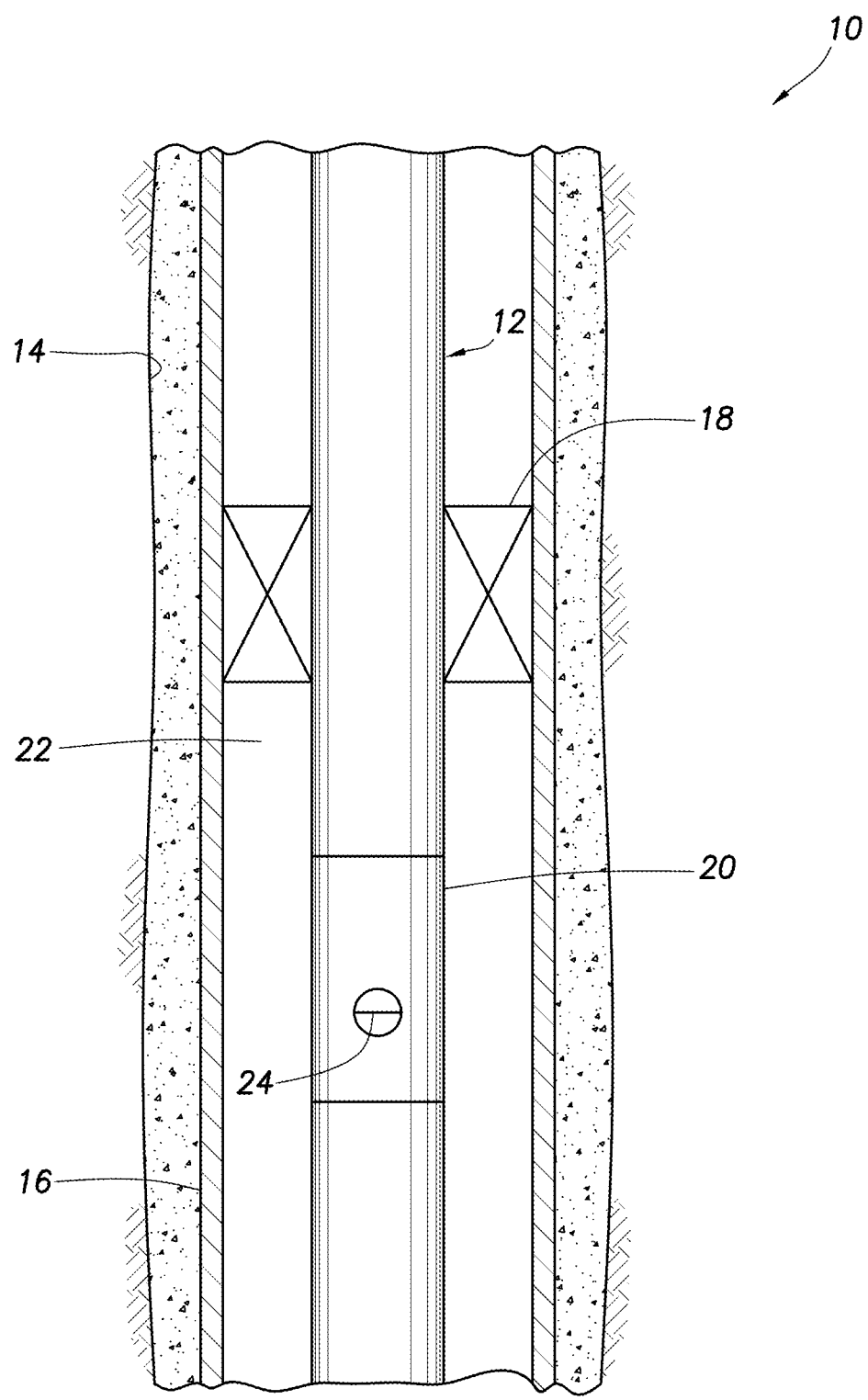
FIG. 1 is a schematic partially cross-sectional view of a well system embodying principles of the present disclosure.

Representatively illustrated in FIG. 1 is a well system 10 which embodies principles of the present disclosure. In the well system 10, a tubular string 12 (such as a production tubing string) is positioned in a wellbore 14 lined with casing 16. The tubular string 12 includes well tools 18, 20.

The well tool 18 is a packer, and the well tool 20 is a flow control device (such as a valve or choke). The packer provides an annular seal between the tubular string 12 and the casing 16, and the flow control device regulates fluid communication between the interior of the tubular string and an annulus 22 formed between the tubular string and the casing. The flow control device includes a closure mechanism 24 which is operated to regulate flow.

At this point, it should be reiterated that the principles of this disclosure are not limited to any of the details of the well system 10 described herein. For example, it is not necessary for the sealing device of this disclosure to be used in a wellbore, in a well tool, in a cased wellbore, in a flow control device, in a tubular string, etc. The closure mechanism 24 could, as another example, be used in a hydraulic setting device of the packer 18, or could be used in another type of well tool. Thus, it should be clearly understood that the well system 10 is only a single example of a wide variety of uses for the principles of the disclosure.

Figure 2:
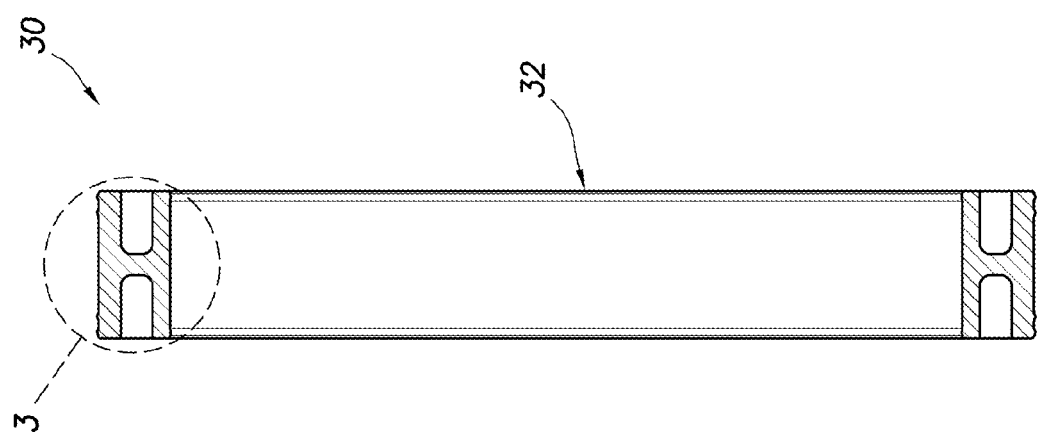
FIG. 2 is an enlarged scale schematic cross-sectional view of a metal seal which may be used as part of a sealing device in the well system.

Referring additionally now to FIG. 2, an enlarged scale cross-sectional view of a portion of a sealing device 30 which may be used for sealing in the closure mechanism 24 is representatively illustrated. However, it should be understood that the sealing device 30 can be used in many other sealing applications and is not necessarily used in the well system 10.

The portion of the sealing device 30 depicted in FIG. 2 is a metal seal 32. An enlarged scale cross-sectional view of the metal seal 32 is representatively illustrated in FIG. 3. In this view, it may be more clearly seen that the metal seal 32 includes radially outwardly projecting metal to metal sealing surfaces 32a, 32b on each of two arms 34a, 34b extending axially outward in opposite directions from a central radially extending web 36. Similarly, the metal seal 32 includes radially inwardly projecting metal to metal sealing surfaces 38 on each of two arms 40a, 40b extending axially outward in opposite directions from the central web 36.

The metal sealing surfaces 32a, 32b, 38 are preferably made of strong, durable and resilient metals, such as Inconel 718, 13-chrome steel, etc. It should be clearly understood that any metal materials may be used for the metal seals 32a, 32b, 38 in keeping with the principles of this disclosure.

Between the pairs of arms 40a, 34a and 40b, 34b are recesses 42a, 42b. A nonmetal seal and/or energizing device may be received in each of the recesses 42a, 42b as described below. Alternatively, the metal seal 32 could be used without the nonmetal seal and/or energizing device.

The metal sealing surfaces 32a, 32b are used to seal against an interior cylindrical sealing surface in the closure mechanism 24 as described below. If the interior cylindrical sealing surface is made of a metal, then a metal to metal seal will be formed between the sealing surfaces.

The arms 34a, 34b are sufficiently resilient to bias the sealing surfaces 32a, 32b into sealing contact with the interior cylindrical sealing surface of the closure mechanism 24. Differential pressure from either side of the seal 32 applied to either of the recesses 42a, 42b will also cause the arms 34a, 34b to be biased radially outward, further increasing contact pressure between the sealing surfaces 32a, 32b and the interior cylindrical sealing surface of the closure mechanism 24.

Figure 4:
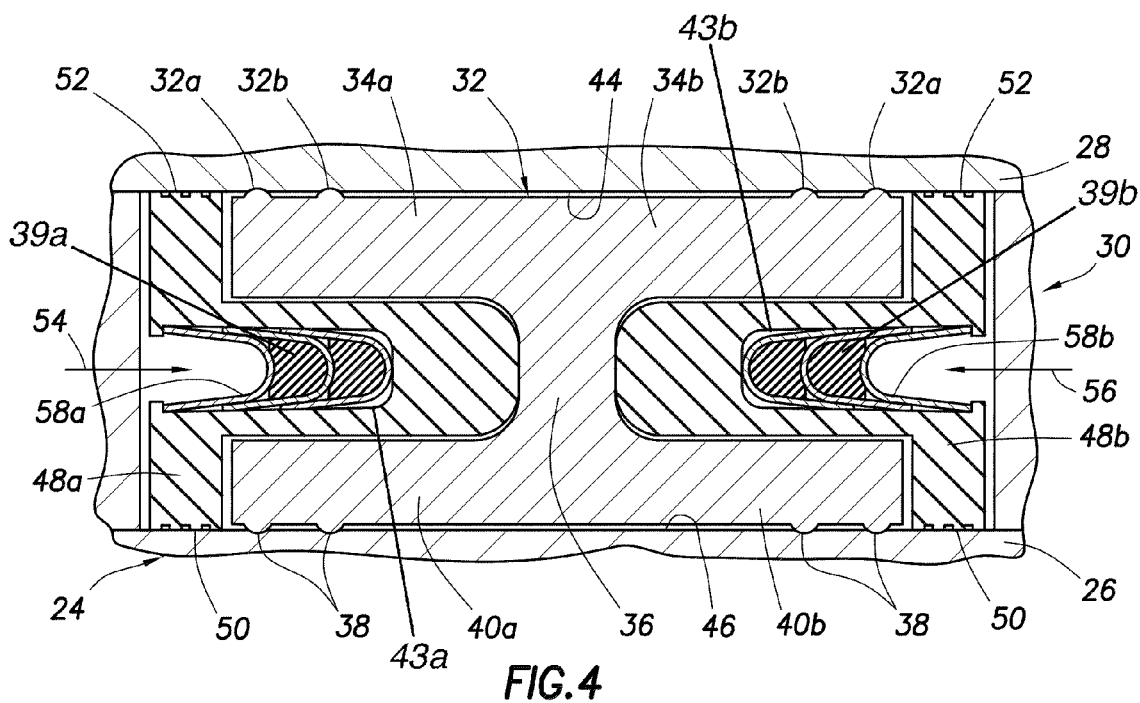
FIG. 4 is a schematic cross-sectional view of the sealing device.

Similarly, the metal sealing surfaces 38 are used to seal against an exterior cylindrical sealing surface in the closure mechanism 24 as described below. If the exterior cylindrical sealing surface is made of a metal, then a metal to metal seal will be formed between the sealing surfaces. Multiple sealing surfaces 38 may be provided on each of the arms 40a, 40b as depicted in FIG. 4.

The arms 40a, 40b are sufficiently resilient to bias the sealing surfaces 38 into sealing contact with the exterior cylindrical sealing surface of the closure mechanism 24. Differential pressure from either side of the seal 32 applied to either of the recesses 42a, 42b will also cause the arms 40a, 40b to be biased radially inward, further increasing contact pressure between the sealing surfaces 38 and the exterior cylindrical sealing surface of the closure mechanism 24.

Note that the arms 34a, 34b are radially thicker in cross-section as compared to the arms 40a, 40b. The inventors have determined that this feature of the seal 32 functions to distribute loading in the seal consistent with the cross-sectional geometry, resulting in a graded stress state across the entire cross-section. However, this configuration is not necessary in keeping with the principles of this disclosure. For example, the arms 40a, 40b could instead have greater or equal radial thickness as compared to the arms 34a, 34b if desired.

Figure 3:
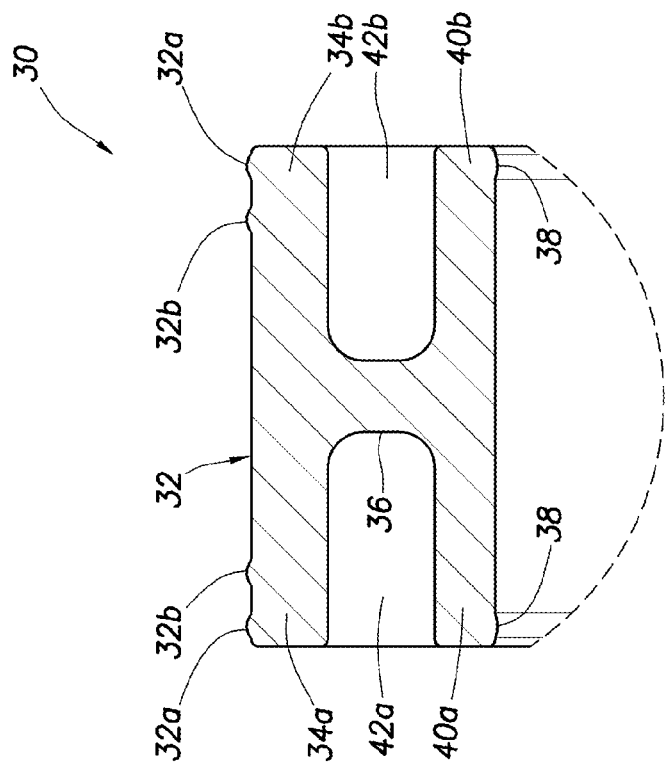
FIG. 3 is a further enlarged scale schematic cross-sectional view of the metal seal.

In the example of FIGS. 2 & 3, the inner arms 40a, 40b are intended to seal against a movable member of the closure mechanism 24, and the reduced radial thickness of the arms provides increased resiliency of the arms, which enables the sealing surfaces 38 to more readily conform to the exterior cylindrical surface of the member as it displaces through the seal 32. The outer arms 34a, 34b, in contrast, are intended to seal against a static member of the closure mechanism 24 (see FIG. 5).

Referring additionally now to FIG. 4, a cross-sectional view of the sealing device 30 installed in the closure mechanism 24 is representatively illustrated. In this example, the sealing device 30 is used to seal an annular space between an outer housing assembly 28 and a closure member 26.

The housing assembly 28 has an internal cylindrical sealing surface 44, and the closure member 26 has an external cylindrical sealing surface 46. The housing assembly 28 remains static relative to the sealing device 30, but the closure member 26 displaces axially relative to the sealing device sometimes.

As depicted in FIG. 4, nonmetal seals 48a, 48b are included in the sealing device 30. The seal 48a is received in the recess 42a, and the seal 48b is received in the recess 42b, of the metal seal 30. The seals 48a, 48b are shown in FIG. 4 as being close fits in the recesses 42a, 42b, but in other embodiments, the seals could be press fit in the recesses, so that the seals will resiliently bias the arms 34a, 34b radially outward, and the arms 40a, 40b radially inward, in order to promote initial sealing between the sealing surfaces 32a, 32b, 38 and the sealing surfaces 44, 46.

The nonmetal seals 48a, 48b include nonmetal sealing surfaces 50 extending radially inward into sealing contact with the surface 46, and nonmetal sealing surfaces 52 extending radially outward into sealing contact with the surface 44. The nonmetal seals 48a, 48b are preferably made of high temperature and well fluid resistant, strong and elastomeric materials, such as NBR, HNBR, fluoroelastomers, etc. Non-elastomeric materials, such as PEEK, etc., may additionally or alternatively be used in the nonmetal seals 48a, 48b. It should be clearly understood that any nonmetal materials may be used for the nonmetal seals 48a, 48b, in keeping with the principles of this disclosure.

Note that the nonmetal seals 48a, 48b are not necessary for the sealing device 30 to seal between the housing assembly 28 and the closure member 26. The sealing device 30 could be provided without the nonmetal seals 48a, 48b, in which case the metal seals 32a, 32b, 38 would still provide sealing engagement with the closure member 26 and housing assembly 28. Use of the nonmetal seals 48a, 48b is preferred when a bubble-tight and/or low pressure differential sealing engagement is required.

When the closure member 26 engages the sealing device 30 as depicted in FIG. 4, the seal surfaces 38, 50 contact the outer surface 46 of the closure member and the arms 40a, 40b are deflected radially outward somewhat. This deflection causes elastic deformation of the arms 40a, 40b, resulting in a biasing force being applied by the arms to the seal surfaces 38. This increases the contact pressure between the seal surfaces 38 and the outer surface 46 of the closure member 26. Contact pressure is also increased between the sealing surfaces 32a, 32b and the inner surface 44 of the housing assembly 28.

Deflection of the arms 40a, 40b as described above will compress a portion of each nonmetal seal 48a, 48b in the recesses 42a, 42b between the respective arms 34a, 40a and 34b, 40b. If the nonmetal seals 48a, 48b are made of a resilient material, this compression will result in a radial biasing force being applied to each arm, thereby further biasing the sealing surfaces 38 into contact with the outer surface 46 of the closure member 26, and biasing the sealing surfaces 32a, 32b into contact with the inner surface 44 of the housing assembly 28.

When a pressure differential 54 is applied across the sealing device 30 in a rightward direction as depicted in FIG. 4, a further radial biasing force will be applied outwardly to the arm 34a and inwardly to the arm 40a, thereby further biasing the sealing surfaces 32a, 32b into contact with the inner surface 44 of the housing assembly 28, and further biasing the sealing surfaces 38 into contact with the outer surface 46 of the closure member 26.

When a pressure differential 56 is applied across the sealing device 30 in a leftward direction as depicted in FIG. 4, a further radial biasing force will be applied outwardly to the arm 34b and inwardly to the arm 40b, thereby further biasing the sealing surfaces 32a, 32b into contact with the inner surface 44 of the housing assembly 28, and further biasing the sealing surfaces 38 into contact with the outer surface 46 of the closure member 26.

If the nonmetal seals 48a, 48b are used in the sealing device 30, then similar increased radial biasing forces will be applied to bias the sealing surfaces 52 into contact with the surface 44 of the housing assembly 28, and to bias the sealing surfaces 50 into contact with the surface 46 of the closure member 26.

Thus, it will be appreciated that each of the sealing surfaces 32a, 32b, 38 is radially biased into metal to metal sealing contact with the inner surface 44 of the housing assembly 28 and the outer surface of the closure member 26, respectively, due to: 1) elastic deformation of the respective arm 34a, 34b, 40a, 40b, 2) compression of the respective nonmetal seal 48a, 48b between the arms due to deformation of the arms, and 3) due to the pressure differential 54 or 56. This results in reliable metal to metal sealing between the metal sealing surfaces 32a, 32b and the inner surface 44 of the housing assembly 28, and between the metal sealing surfaces 38 and the outer surface 46 of the closure member 26.

If, however, any of the sealing surfaces 32a, 32b, 38 or the sealing surfaces 44, 46 should become damaged, so that metal to metal sealing therebetween cannot be achieved, sealing contact between the nonmetal seals 48a, 48b and the closure member 26 and housing assembly 28 may still be possible.

To further enhance the sealing capabilities of the sealing device 30, energizing devices 58a, 58b are provided for further biasing the sealing surfaces 50, 52 into sealing contact with the respective surfaces 46, 44. The energizing devices 58a, 58b are configured as resilient spring-type devices having a generally U-shaped cross-section. The energizing devices 58a, 58b apply a radially inwardly directed biasing force to the sealing surfaces 50 and a radially outwardly directed biasing force to the sealing surfaces 52. The energizing device 58a may be received in a recess 43a of the nonmetal seal 48a, and the energizing device 58b may be received in a recess 43b of the nonmetal seal 48b. As seen in FIG. 4, multiple energizing devices 58a, 58b may be received in the respective recesses 43a, 43b. A nonmetal material 39a may be disposed between adjacent energizing devices 58a, and a nonmetal material 39b may be disposed between adjacent energizing devices 58b. The nonmetal material may bias the adjacent energizing devices 58a or 58b away from each other.

The energizing devices 58a, 58b ensure that bubble-tight sealing contact is provided between the respective sealing surfaces 50, 46 and 52, 44, even at extremely low pressure differentials. However, it should be understood that use of the energizing devices 58a, 58b is not necessary in keeping with the principles of the present disclosure.

Figure 5:
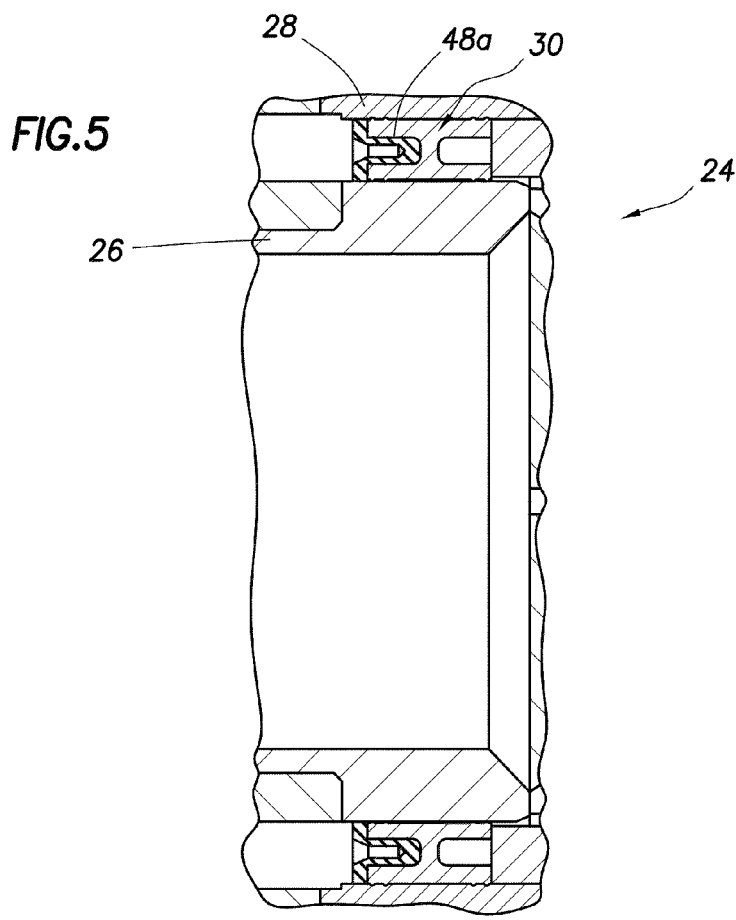
FIG. 5 is a schematic cross-sectional view of the sealing device of FIG. 4 as used in a closure mechanism in the well system of FIG. 1.

Referring additionally now to FIG. 5, the sealing device 30 is representatively illustrated as installed in the closure mechanism 24 of the well tool 20 in the system 10. Note that, in this example, only one of the nonmetal seals 48a is used. This demonstrates that various configurations, arrangements and combinations of the seals 32, 48a, 48b may be used without departing from the principles of this disclosure.

It may now be fully appreciated that the sealing device 30 as described above provides significant advancements in the art of sealing against both very high and very low pressure differentials, against both static and dynamic members, and in extreme environments, such as subterranean wells.

The above disclosure describes a well tool 20 which includes an internal cylindrical sealing surface 44, an external cylindrical sealing surface 46 and a sealing device 30 for sealing between the internal and external cylindrical sealing surfaces 44, 46. The sealing device 30 includes a metal seal 32 with at least first and second metal sealing surfaces 32a, 32b, 38, the first metal sealing surface 32a, 32b forming a metal to metal seal with the internal cylindrical sealing surface 44, and the second metal sealing surface 38 forming a metal to metal seal with the external cylindrical sealing surface 46.

The sealing device 30 may also include at least one nonmetal seal 48a. The nonmetal seal 48a may bias the first metal sealing surface 32a, 32b against the internal cylindrical sealing surface 44 and may bias the second metal sealing surface 38 against the external cylindrical sealing surface 46 in response to a first pressure differential 54 across the sealing device 30.

The sealing device 30 may also include a second nonmetal seal 48b. The second nonmetal seal 48b may bias a third metal sealing surface 32a, 32b against the internal cylindrical sealing surface 44 and may bias a fourth metal sealing surface 38 against the external cylindrical sealing surface 46 in response to a second pressure differential 56 across the sealing device 30, with the second pressure differential being in an opposite direction to the first pressure differential 54.

The well tool 20 may also include an energizing device 58a which biases a first nonmetal sealing surface 50 of the nonmetal seal 48a into sealing contact with the external cylindrical sealing surface 46, and which biases a second nonmetal sealing surface 52 of the nonmetal seal into sealing contact with the internal cylindrical sealing surface 44.

The nonmetal seal 48a may be received in a recess 42a formed radially between the first and second metal sealing surfaces 32a, 32b, 38. The metal seal 32 may have a generally I-shaped cross-section, with arms 34a, 34b, 40a, 40b extending axially outward from a radially extending central web 36. One of the arms 40a may be positioned radially inward relative to another one of the arms 34a.

Also described above is a sealing device 30 which includes a metal seal 32 with at least first and second metal sealing surfaces 32a, 32b, 38. The first metal sealing surface 32a, 32b faces radially outward, and the second metal sealing surface 38 faces radially inward. The sealing device 30 also includes a nonmetal seal 48a with at least first and second nonmetal sealing surfaces 50, 52. The first nonmetal sealing surface 52 is positioned proximate the first metal sealing surface 32a, 32b and faces radially outward, and the second nonmetal sealing surface 50 is positioned proximate the second metal sealing surface 38 and faces radially inward.

A method of sealing between a housing assembly 28 and a closure member 26 is also described above. The method includes the steps of: providing a sealing device 30 including at least one metal seal 32 and at least a first nonmetal seal 48a; applying a first pressure differential 54 in a first direction across the sealing device 30 while the sealing device seals between the housing assembly 28 and the closure member 26; and the first pressure differential 54 increasing contact pressure in a metal to metal seal between the housing assembly 28 and a first metal sealing surface 32a, 32b on the metal seal 32, and increasing contact pressure in a metal to metal seal between the closure member 26 and a second metal sealing surface 38 on the metal seal.

The first pressure differential 54 may increase contact pressure between the housing assembly 28 and a first nonmetal sealing surface 52 on the first nonmetal seal 48a, and may increase contact pressure between the closure member 26 and a second nonmetal sealing surface 50 on the first nonmetal seal.

The method may also include the step of applying a second pressure differential 56 in a second direction across the sealing device 30 while the sealing device seals between the housing assembly 28 and the closure member 26, the second direction being opposite to the first direction. The second pressure differential 56 may increase contact pressure in a metal to metal seal between the housing assembly 28 and a third metal sealing surface 32a, 32b on the metal seal 32, and may increase contact pressure in a metal to metal seal between the closure member 26 and a fourth metal sealing surface 38 on the metal seal 32.

The second pressure differential 56 may increase contact pressure between the housing assembly 28 and a third nonmetal sealing surface 52 on the a second nonmetal seal 48b, and may increase contact pressure between the closure member 26 and a fourth nonmetal sealing surface 50 on the second nonmetal seal.

The sealing device 30 in the method may also include an energizing device 58a which biases the first nonmetal sealing surface 52 of the first nonmetal seal 48a into sealing contact with the housing assembly 28, and which biases a second nonmetal sealing surface 50 of the first nonmetal seal into sealing contact with the closure member 26.

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of the present disclosure. Accordingly, the foregoing detailed description is to be clearly understood as being given by way of illustration and example only, the spirit and scope of the present invention being limited solely by the appended claims and their equivalents.

What is claimed is:
1. A well tool, comprising:
an internal cylindrical sealing surface;
an external cylindrical sealing surface; and
a sealing device that seals between the internal and external cylindrical sealing surfaces, the sealing device including a metal seal with at least first and second metal sealing surfaces, the metal seal having a generally I-shaped cross-section, wherein the metal seal prevents fluid flow through the sealing device, the first metal sealing surface forming a metal to metal seal with the internal cylindrical sealing surface, and the second metal sealing surface forming a metal to metal seal with the external cylindrical sealing surface, wherein the sealing device further includes at least a first nonmetal seal disposed in a first transverse facing recess in the metal seal, the first recess positioned between the first and second metal sealing surfaces, wherein the first nonmetal seal biases the first metal sealing surface against the internal cylindrical sealing surface and biases the second metal sealing surface against the external cylindrical sealing surface in response to a first pressure differential across the sealing device, wherein the sealing device further includes a second nonmetal seal disposed in a second transverse facing recess in the metal seal, the second recess positioned between the third and fourth metal sealing surfaces, wherein the second nonmetal seal biases the third metal sealing surface against the internal cylindrical sealing surface and biases the fourth metal sealing surface against the external cylindrical sealing surface in response to a second pressure differential across the sealing device, the second pressure differential being in an opposite direction to the first pressure differential, wherein the first and second nonmetal seals are in contact with the internal and external cylindrical sealing surfaces, and wherein the first nonmetal seal includes a third transverse facing recess which axially overlaps at least a portion of the first recess, and the second nonmetal seal includes a fourth transverse facing recess which axially overlaps at least a portion of the second recess.

2. The well tool of claim 1, further comprising an energizing device which biases a first nonmetal sealing surface of the first nonmetal seal into sealing contact with the external cylindrical sealing surface, and which biases a second nonmetal sealing surface of the first nonmetal seal into sealing contact with the internal cylindrical sealing surface.

3. The well tool of claim 1, wherein the metal seal includes arms extending axially outward from a radially extending central web.

4. The well tool of claim 3, wherein a first one of the arms is positioned radially inward relative to a second one of the arms.

5. A sealing device, comprising:
at least one metal seal with a generally I-shaped cross-section, the metal seal including at least first and second metal sealing surfaces, the first metal sealing surface facing radially outward, whereby the first metal sealing surface forms a metal to metal seal with an internal cylindrical surface, and the second metal sealing surface facing radially inward, whereby the second metal sealing surface forms a metal to metal seal with an external cylindrical surface;

a first transverse facing recess of the metal seal, the first recess being positioned between the first and second metal sealing surfaces of the metal seal, wherein the metal seal prevents fluid flow through the sealing device;

at least a first nonmetal seal received in the first recess, the first nonmetal seal including at least first and second nonmetal sealing surfaces, the first nonmetal sealing surface being positioned proximate the first metal sealing surface and facing radially outward, whereby the first nonmetal sealing surface contacts and forms a seal with the internal cylindrical surface, and the second nonmetal sealing surface being positioned proximate the second metal sealing surface and facing radially inward, whereby the second nonmetal sealing surface contacts and forms a seal with the external cylindrical surface, wherein the first nonmetal seal biases the first metal sealing surface radially outward and biases the second metal sealing surface radially inward when a first pressure differential is applied across the sealing device; and a second nonmetal seal received in a second transverse facing recess of the metal seal, the second recess being positioned between third and fourth metal sealing surfaces of the metal seal, whereby the third metal sealing surface forms a metal to metal seal with the internal cylindrical surface, and the fourth metal sealing surface forms a metal to metal seal with the external cylindrical surface, wherein the second nonmetal seal includes third and fourth nonmetal sealing surfaces, the third nonmetal sealing surface positioned proximate the third metal sealing surface and facing radially outward, whereby the third nonmetal sealing surface contacts and forms a seal with the internal cylindrical surface, and the fourth nonmetal sealing surface being positioned proximate the fourth metal sealing surface and facing radially inward, whereby the fourth nonmetal sealing surface contacts and forms a seal with the external cylindrical surface, wherein the second nonmetal seal biases the third metal sealing surface radially outward and biases the fourth metal sealing surface radially inward in response to a second pressure differential across the sealing device, the second pressure differential being in an opposite direction to the first pressure differential, and wherein the first nonmetal seal includes a third transverse facing recess which axially overlaps at least a portion of the first recess, and the second nonmetal seal includes a fourth transverse facing recess which axially overlaps at least a portion of the second recess.

6. The sealing device of claim 5, further comprising an energizing device which biases the first nonmetal sealing surface radially outward, and which biases the second nonmetal sealing surface radially inward.

7. The sealing device of claim 5, wherein the metal seal includes arms extending axially outward from a radially extending central web.

8. The sealing device of claim 7, wherein a first one of the arms is positioned radially inward relative to a second one of the arms.

9. A method of sealing between a housing assembly and a closure member, the method comprising:
providing a sealing device including at least one metal seal and at least first and second nonmetal seals, wherein the metal seal prevents fluid flow through the sealing device, wherein the metal seal has a generally I-shaped cross-section which includes first and second transverse facing recesses, wherein the first and second recesses are bounded by separate pairs of arms extending axially outward from a radially extending central web, wherein the first nonmetal seal is disposed in the first recess of the metal seal and the second nonmetal seal is disposed in the second recess of the metal seal, and wherein the first nonmetal seal includes a third transverse facing recess which axially overlaps at least a portion of the first recess, and the second nonmetal seal includes a fourth transverse facing recess which axially overlaps at least a portion of the second recess;

applying a first pressure differential in a first direction across the sealing device while the sealing device seals between the housing assembly and the closure member, wherein the first pressure differential increases contact pressure in a metal to metal seal between an internal cylindrical surface of the housing assembly and a first metal sealing surface on the metal seal, and increases contact pressure in a metal to metal seal between an external cylindrical surface of the closure member and a second metal sealing surface on the metal seal, wherein the first pressure differential increases contact pressure between the internal cylindrical surface and a first nonmetal sealing surface on the first nonmetal seal, and increases contact pressure between the external cylindrical surface and a second nonmetal sealing surface on the first nonmetal seal; and applying a second pressure differential in a second direction across the sealing device while the sealing device seals between the housing assembly and the closure member, the second direction being opposite to the first direction, wherein the second pressure differential increases contact pressure in a metal to metal seal between the internal cylindrical surface and a third metal sealing surface on the metal seal, and increases contact pressure in a metal to metal seal between the external cylindrical surface and a fourth metal sealing surface on the metal seal, wherein the second pressure differential increases contact pressure between the internal cylindrical surface and a third nonmetal sealing surface on the second nonmetal seal, and increase contact pressure between the external cylindrical surface and a fourth nonmetal sealing surface on the second nonmetal seal.

10. The method of claim 9, wherein the sealing device further includes an energizing device which biases the first nonmetal sealing surface of the first nonmetal seal into sealing contact with the housing assembly, and which biases the second nonmetal sealing surface of the first nonmetal seal into sealing contact with the closure member.

11. A sealing device, comprising:

at least one metal seal including at least first and second metal sealing surfaces, the first metal sealing surface facing radially outward, whereby the first metal sealing surface forms a metal to metal seal with an internal cylindrical surface, and the second metal sealing surface facing radially inward, whereby the second metal sealing surface forms a metal to metal seal with an external cylindrical surface, wherein a first transverse facing recess is positioned between the first and second metal sealing surfaces, and wherein the metal seal prevents fluid flow through the sealing device;

at least a first nonmetal seal received in the first recess, the first nonmetal seal including at least first and second nonmetal sealing surfaces, the first nonmetal sealing surface being positioned proximate the first metal sealing surface and facing radially outward, and the second nonmetal sealing surface being positioned proximate the second metal sealing surface and facing radially inward, wherein a second transverse facing recess is positioned between the first and second nonmetal sealing surfaces, the second transverse facing recess at least partially axially overlapping the first transverse facing recess;

a second nonmetal seal which biases a third metal sealing surface radially outward and biases a fourth metal sealing surface radially inward in response to a second pressure differential across the sealing device, the second pressure differential being in an opposite direction to the first pressure differential; and a first energizing device received in the second recess, wherein the first energizing device biases the first nonmetal sealing surface radially outward.

12. The sealing device of claim 11, wherein the first energizing device biases the second nonmetal sealing surface radially inward.

13. The sealing device of claim 11, wherein the first energizing device includes at least first and second energizing devices, and wherein the first and second energizing devices each have a generally U-shaped cross-section.

14. The sealing device of claim 13, wherein the first energizing device is received in the second transverse facing recess and at least partially axially overlaps the first transverse facing recess, wherein the second energizing device is received in the generally U-shaped cross-section of the first energizing device with a non-metal material disposed between the first and second energizing devices, and wherein the nonmetal material biases the first and second energizing devices away from each other.

15. The sealing device of claim 11, wherein the second nonmetal seal comprises third and fourth nonmetal sealing surfaces.

16. The sealing device of claim 15, further comprising a second energizing device that biases the third nonmetal sealing surface radially outward, and biases the fourth nonmetal sealing surface radially inward.

17. The sealing device of claim 11, wherein the metal seal has a generally I-shaped cross-section, the metal seal including arms extending axially outward from a radially extending central web.

18. The sealing device of claim 17, wherein a first one of the arms is positioned radially inward relative to a second one of the arms.

* * * * *